United States Patent

Rogers, Jr. et al.

(10) Patent No.: US 6,464,287 B2
(45) Date of Patent: Oct. 15, 2002

(54) DRIVE MECHANISM FOR POWER OPERATED SLIDEABLE SIDE DOOR

(75) Inventors: Lloyd Walker Rogers, Jr., Shelby Township, MI (US); Jeff S Hamminga, Windsor (CA); Douglas G Ellis, White Lake, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/867,863

(22) Filed: May 30, 2001

(65) Prior Publication Data

US 2002/0125735 A1 Sep. 12, 2002

Related U.S. Application Data

(60) Provisional application No. 60/275,178, filed on Mar. 12, 2001.

(51) Int. Cl.$^7$ .................................................. B60J 5/06
(52) U.S. Cl. .......................................... 296/155; 49/360
(58) Field of Search ............................. 296/155; 49/360

(56) References Cited

U.S. PATENT DOCUMENTS

| 5,316,365 | A |   | 5/1994 | Kuhlman et al. |        |
|-----------|---|---|--------|----------------|--------|
| 5,319,880 | A | * | 6/1994 | Kuhlman ...... | 49/360 |
| 5,867,940 | A | * | 2/1999 | Watanaba et al. | 49/360 |

* cited by examiner

Primary Examiner—D. Glenn Dayoan
Assistant Examiner—Lori L Coletta
(74) Attorney, Agent, or Firm—Kathryn A. Marra

(57) ABSTRACT

A passenger van is equipped with a drive mechanism for power operation of a slideable side door. The drive mechanism has an endless flexible drive member that travels in a closed loop which includes travel through a center track that supports and guides a hinge and roller assembly that is attached to the rear of the side door. A clutch is mounted on the hinge and roller assembly to clamp onto the flexible drive member for power operation. The clutch is operated by an actuator that includes a solenoid and a linkage between the solenoid and a moveable plate of the clutch. An electromagnetic clutch may be used as an alternative.

11 Claims, 3 Drawing Sheets

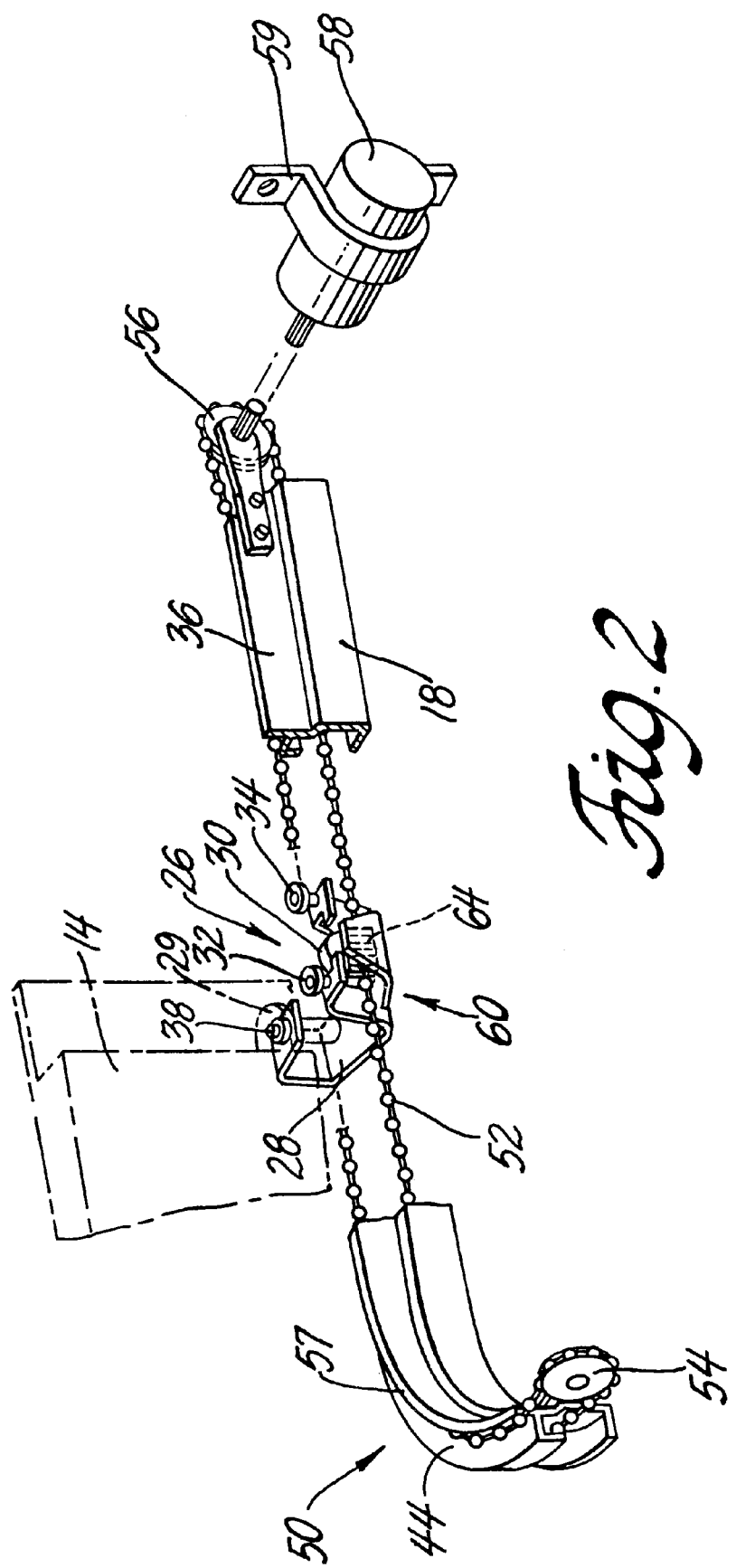

DRIVE MECHANISM FOR POWER OPERATED SLIDEABLE SIDE DOOR

RELATED APPLICATION

This patent application claims benefit of U.S. Provisional patent application No. 60/275,178 filed Mar. 12, 2001.

FIELD OF THE INVENTION

This invention relates to automotive vehicles having a slideable side door and more particularly to a drive mechanism for a power operated slideable side door.

BACKGROUND OF THE INVENTION

U.S. Pat. No. 5,316,365 granted to Howard W. Kuhlman and Jeffrey K. Joyner May 31, 1994 discloses a passenger van that has a slidable side door. The door is supported on and slideable in three tracks. A module for power operation of the door is mounted inside the van adjacent to the center track that supports and guides the rear of the door. The module includes a front cable and a rear cable. The front cable is attached to a front cable drive pulley, then extends through a front cable roller guide assembly and is then attached to a hinge and roller assembly. The rear cable is attached to a rear cable drive pulley then extends through a rear cable roller guide, assembly, and is then attached to the hinge and roller assembly. The front and rear cable drive pulleys are driven by an electric motor via an electromagnetic clutch to open and close the sliding door. The electromagnetic clutch permits manual opening and closing of the side door when it is disengaged, thus avoiding the need to backdrive the electric motor. However, the cables and pulleys must be backdriven during manual operation.

SUMMARY OF THE INVENTION

This invention provides a drive mechanism for power operation of a slideable side door of an automotive vehicle, such as a passenger van. The drive mechanism has an electric motor driven flexible drive member that travels in a closed loop, a portion of which is through a track that supports and guides a hinge and roller assembly that is attached to the door. The hinge and roller assembly has a normally disengaged clutch that is actuated to clamp the hinge and roller assembly to the flexible drive member for power operation of the door. Manual operation requires little effort because the clutch is normally disengaged so that neither the flexible drive member nor the pulleys nor the electric motor need be back driven.

BRIEF DESCRIPTION OF THE DRAWINGS

FIG. 2 is a schematic perspective view of the drive mechanism for opening and closing the sliding side door shown in FIG. 1;

DESCRIPTION OF THE PREFERRED EMBODIMENT

Figure 1:
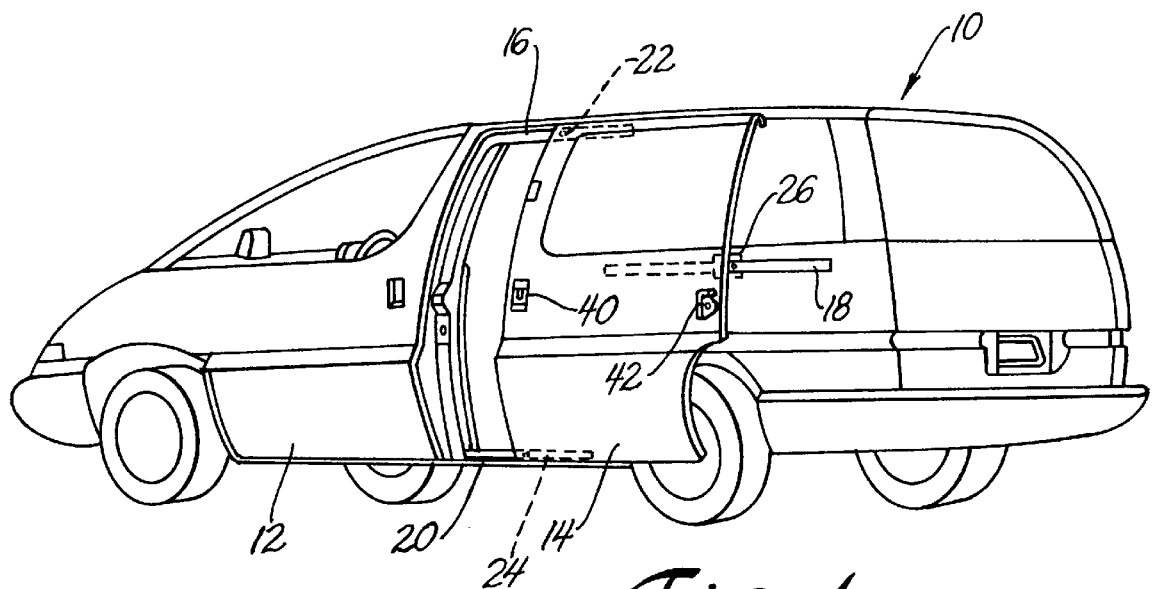
FIG. 1 is a side view of a passenger van equipped with a sliding side door of the invention.

Referring now to FIGS. 1 and 2, an automotive vehicle, such as a passenger van 10 have a hinged front door 12 on each side of the vehicle and at least one sliding side door 14 behind the front doors that may be power driven. Such vehicles are well known and need not be described in detail. See for instance the Kuhlman '365 patent discussed above.

The power sliding door 14 is supported and guided by an upper track 16, a center track 18, and a lower track 20 as shown in FIG. 1. An upper hinge and roller assembly 22 is attached to the upper forward corner of the power sliding door and runs in the upper track 16. A lower hinge and roller assembly 24 is attached to the lower forward corner of the power sliding door and runs in the lower track 20. A hinge and roller assembly 26 is pivotally attached to the rear portion of the power sliding door 14 between the upper and lower portions of the power sliding door.

Figure 3:
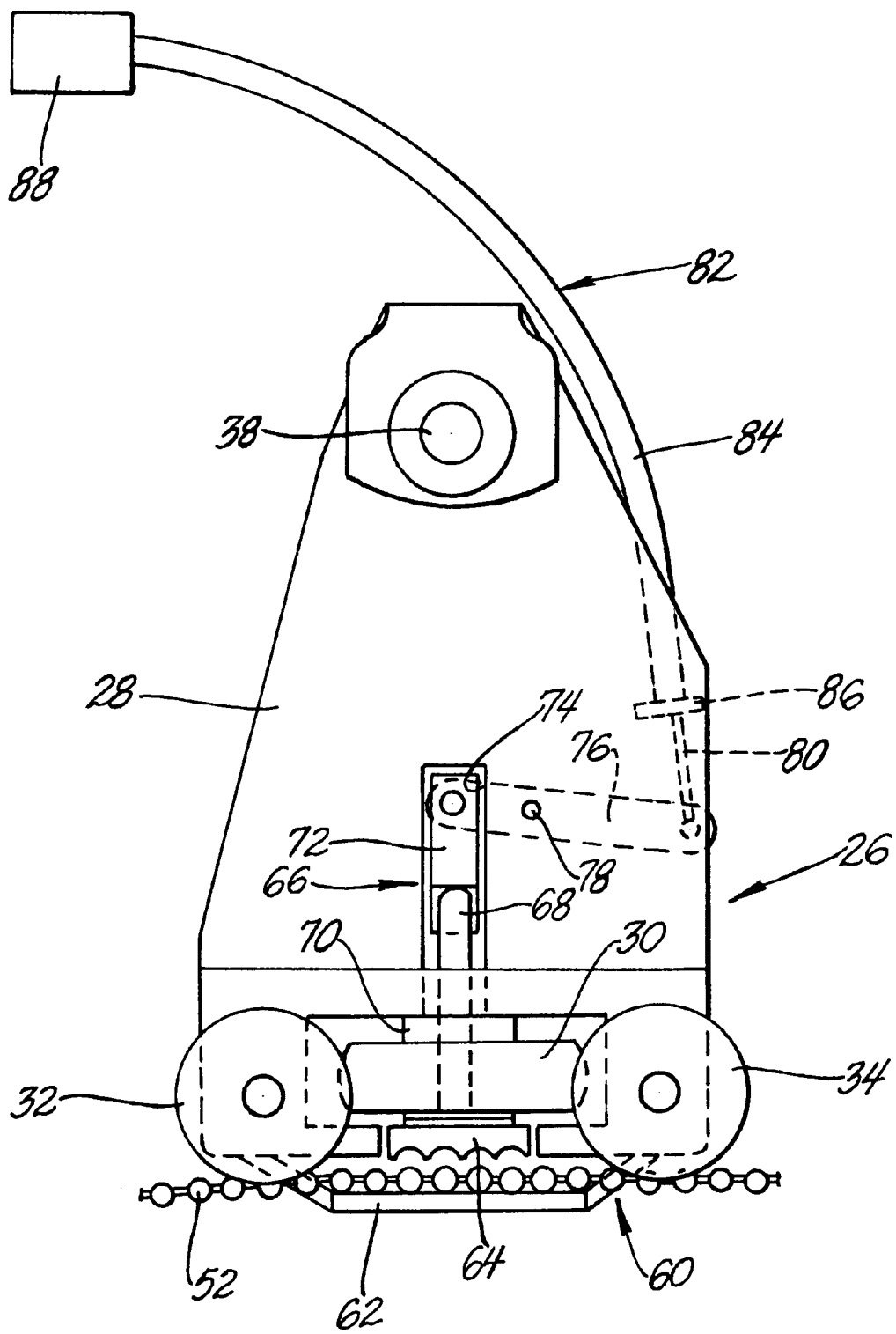
FIG. 3 is an enlarged top view of a hinge and roller assembly in the drive mechanism shown in FIG. 2.

Referring now to FIGS. 2 and 3, the hinge and roller assembly 26 has a carriage 28. A support roller 30 pivotally attached to carriage 28 for rotation about a generally horizontal axis, supports the rear portion of door 14 and runs in the center track 18. Two guide rollers 32 and 34 are pivotally attached to carriage 28 for rotation about generally vertical axes and run in an upper channel portion 36 of the center track 18. A vertical hinge pin 38 passes through a pair of hinge apertures in carriage 28 and through hinge apertures in a bracket 29 attached to the rear edge of the power sliding door 14 to connect carriage 28 to power sliding door 14.

The power sliding door 14 moves horizontally inward toward the center of the van 10 for latching and sealing. Latches 40 and 42 are provided at the front and rear of the power sliding door 14 which moves horizontally inward to compress resilient seals and to latch. Inward horizontal movement of the sliding door 14 is obtained by curving the forward ends of the upper, center and lower tracks 16, 18 and 20 inwardly toward the center of van 10. When the hinge and roller assembly 26 passes around the curved forward end 44 of center track 18, the hinge and roller assembly 26 pivots inwardly and moves the rear portion of side door 14 horizontally inward toward the side of van 10.

The drive mechanism 50 for opening and closing the side door 14 comprises the hinge and roller assembly 26 and further includes a flexible drive member 52. Flexible drive member 52, which may be a beaded cable, travels in a closed loop with a portion of the loop disposed in track 18 along the entire length of the track as best shown in FIG. 2. The portion of the loop disposed in track 18 travels in close proximity to the hinge and roller assembly 26. A front pulley 54 engages the flexible drive member 52 at a front end of track 18 and a rear pulley 56 engages the flexible drive member 52 at a rear end of the track 18. A portion of the loop that is disposed outside the track 18 runs between pulleys 54 and 56. The portion is guided by a fence 57 or some other guide that may or may not be an integral part of track 18. An electric motor 58 attached to van 10 by a bracket 59 drives one of the pulleys, preferably rear pulley 56 which usually has a roomier environment. In any event, the driver pulley is preferably shaped to mate with the profile of the flexible drive member, for example, by matching the periphery of the pulley to mate with the profile of the beaded cable as shown in FIG. 2.

The hinge and roller assembly 26 includes a clutch 60 for clamping the hinge and roller assembly 26 to the flexible drive member 52 as best shown in FIG. 3. Clutch 60 comprises a stationary plate 62 at an inner end of carriage 28, a moveable plate 64, and an actuator 66. Plates 62 and 64 straddle a portion of the flexible drive member 52 that is in track 18. Actuator 66 moves moveable plate 64 from the disengaged position of FIG. 3 toward stationary plate 62 to clamp the an intervening portion of the flexible drive member 52 between the stationary plate 62 and the moveable plate 64 for driving side door 14 to the open position or to the closed position. Actuator 66 moves plate 64 away from stationery plate 62 to release side door 14 for opening and closing door 14 manually.

Stationary plate 62 is preferably flat while moveable plate 64 is preferably grooved to mate with the profile of the beaded cable that is used as the flexible drive member 52. Plate 64 has a stem 68 that extends through a journal hub 70 that is attached to carriage 28 for supporting roller 30 rotationally. Stem 68 has an enlarged end 72 that slides in a cylinder 74 that is an integral part of carriage 28. A transfer lever 76 is pivotally attached to carriage 28 by a pivot pin 78. One end of transfer lever 76 is pivotally attached to end 72 of stem 68. The other end is attached to the core 80 of a conventional push-pull cable 82 that has a jacket 84 that has one end attached to the carriage 28 by a fastener 86. Push-pull cable 82 is operated by a solenoid 88 that is inside side door 14 and connected to the opposite end of push-pull cable 82.

Drive mechanism 50 operates in the following manner. In order to power open the side door 14, electric motor 58 and solenoid 88 are energized, with solenoid 88 preferably being energized first for a short period of time. When solenoid 88 is energized, core 80 of push-pull cable 82 is retracted rotating transfer lever 76 counter-clockwise as viewed in FIG. 3. This advances moveable plate 64 toward stationary plate 62 clamping a portion of the flexible drive member 52 between the two plates. The energization of electric motor 58 then rotates rear pulley 56 clockwise as viewed in FIG. 2 which then drives flexible drive member 52 so that it travels in a closed loop in a clockwise direction. Flexible drive member 52 thus pulls hinge and roller assembly 26 and side door 14 that is attached to the assembly rearward from a closed position to an open position, that is, to the right as viewed in FIG. 2. When side door 14 is fully open, electric motor 58 and solenoid 88 are de-energized by any well know technique, such as by operating limit switches. When de-energized, solenoid 88 returns moveable plate 64 to the position of FIG. 3 where the clutch 60 is disengaged and where side door 14 and the hinge and roller assembly 26 move freely with respect to the flexible drive member 52.

Side door 14 is now ready to be closed either by power or manual force. For a power closure, solenoid 88 and electric motor 58 are energized. Solenoid 88 engages clutch 60 clamping hinge and roller assembly 26 to flexible drive member 52 as before. However, electric motor 58 is now reversed so that the flexible drive member 52 travels counterclockwise in the loop as viewed in FIG. 2 which moves side door 14 to the left to the closed position. When side door 14 is fully closed, solenoid 88 and electric motor 58 are deenergized.

In the alternative, side door 14 can be closed or opened manually without much effort because side door 14 and the hinge and roller assembly 26 move freely with respect to flexible drive member 52 avoiding the necessity of back driving the flexible drive member 52, the pulleys 54 and 56 and the electric motor 58.

Figure 4:
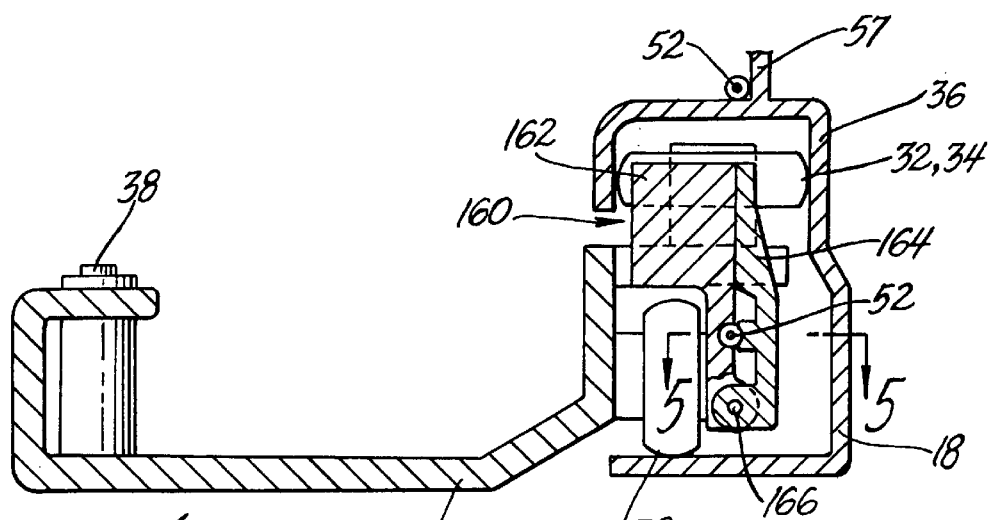
FIG. 4 is an enlarged side view of an alternate hinge and roller assembly for the drive mechanism shown in FIG. 2.
Figure 5:
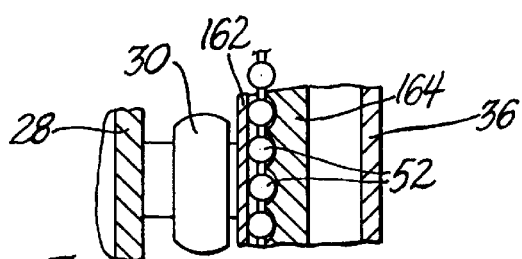
FIG. 5 is a section taken substantially along the line 5—5 of FIG. 4 looking in the direction of the arrows.

FIG. 4 shows an alternative hinge and roller assembly 126 that can be used in place of the hinge and roller assembly 26 shown in FIGS. 1, 2 and 3. Hinge and roller assembly 126 is substantially identical to hinge and roller assembly 26 with respect to the mechanical parts that are used to support and guide the side door 14 in track 18 and these parts are labeled with the same identifying numerals. However, the clutch 60 has been replaced by an electromagnetic clutch 160 that comprises a stationary electromagnet 162 and an armature 164 that is pivotally mounted on carriage 28 by a pivot pin 166. This second embodiment of the invention works substantially in the same way as the first embodiment. To power operate the side door 14, electromagnet 162 and electric motor 58 are energized. Energization of electromagnet 162 pivots armature 164 counterclockwise into engagement with the face of the electromagnet 162 as viewed in FIG. 4. This clamps the hinge and roller assembly 126 to the flexible drive member 52 and the side door 14 is driven to the open or closed position by electric motor 58. When side door 14 is fully closed or fully open, electromagnetic clutch 160 and electric motor 58 are deenergized in any suitable manner so that side door 14 may then be operated manually without much effort whenever a manual operation is desired or necessary because of a power failure.

While a specific flexible drive member, in the form of a beaded cable 52 has been illustrated, any type of flexible drive member may be used for example, a flexible drive belt, a ball type chain or a link type chain. Moreover, while the preferred embodiment is illustrated with only two pulleys 54 and 56 for driving and guiding the flexible drive member 52 additional guides, both stationary and rotary can be used to establish the travel loop for the flexible drive member 52. Furthermore, the drive mechanism can be used to stop the side door at any intermediate position between the fully open and the fully closed positions by use of well known electrical controls. In other words, while preferred embodiments of the invention have been shown and described, other embodiments will now become apparent to those skilled in the art. Accordingly, the invention is not to be limited to that which is shown and described but by the following claims.

We claim:

1. A drive mechanism for a power operated slideable side door that is attached to a hinge and roller assembly that travels in a track of a vehicle comprising:

a flexible drive member that travels in the track juxtaposed the hinge and roller assembly, a front pulley engaging the flexible drive member at a front end of the track, a rear pulley engaging the flexible drive member at a rear end of the track, an electric motor driving one of the pulleys, and a clutch mounted on the hinge and roller assembly for clamping the hinge and roller assembly to the flexible drive member.

2. The drive mechanism as defined in claim 1 wherein the clutch comprises a stationary plate and a moveable plate straddling a portion of the flexible drive member, and an actuator for moving the moveable plate with respect to the stationary plate to clamp the portion of the flexible drive member between the stationary plate and the moveable plate for driving the door or to release the door for manual movement without back driving the flexible drive member.

3. The drive mechanism as defined in claim 2 wherein the actuator further comprises a push-pull cable operated by a solenoid.

4. The drive mechanism as defined in claim 3 wherein the actuator further comprises a push rod acting on the moveable plate and a transfer lever attached to the push-pull cable and the push rod.

5. The drive mechanism as defined in claim 2 wherein the clutch is an electromagnetic clutch and the moveable plate of the clutch is an armature of the electromagnetic clutch.

6. The drive mechanism as defined in claim 5 wherein the electromagnetic clutch includes a stationery electromagnet that is mounted on the hinge and roller assembly and associated with the stationery plate of the clutch and a pivotally mounted plate that serves as the armature of the electromagnet and the moveable plate of the clutch.

7. A drive mechanism for a power operated slideable side door that is attached to a hinge roller and assembly that travels in a track of a vehicle comprising:

a clutch mounted on the hinge and roller assembly, the clutch having a stationery plate and a moveable plate, an endless flexible drive member that travels in a loop through the track member and between the stationary plate and the moveable plate of the clutch, a front pulley engaging the flexible drive member at the front of the track, a rear pulley engaging the endless flexible drive member at the rear of the track, an electric motor drivingly connected to the rear pulley, and an actuator for moving the moveable plate with respect to the stationary plate to clamp a portion of the endless flexible drive member between the stationary plate and the moveable plate for driving the door toward an open position or toward a closed position.

8. The drive mechanism as defined in claim 7 wherein the actuator further comprises a push-pull cable operated by a solenoid.

9. The drive mechanism as defined in claim 8 wherein the actuator further comprises a push rod acting on the moveable plate and a transfer lever attached to the push-pull cable and the push rod.

10. The drive mechanism as defined in claim 7 wherein the clutch is an electromagnetic clutch and the moveable plate of the clutch is an armature of the electromagnetic clutch.

11. The drive mechanism as defined in claim 10 wherein the electromagnetic clutch includes a stationery electromagnet that is mounted on the hinge and roller assembly and associated with the stationery plate of the clutch and a pivotally mounted plate that serves as the armature of the electromagnet and the moveable plate of the clutch.

* * * * *